United States Patent [19]

Macken

[11] Patent Number: 4,757,512
[45] Date of Patent: Jul. 12, 1988

[54] DISCHARGE DRIVEN SILVER OXIDE CATALYST WITH APPLICATION TO A $CO_2$ LASER

[76] Inventor: John A. Macken, 3755 Wallace Rd., Santa Rosa, Calif. 95404

[21] Appl. No.: 16,060

[22] Filed: Feb. 18, 1987

[51] Int. Cl.[4] ............................................. H01S 3/22
[52] U.S. Cl. ...................................... 372/59; 372/98; 372/92
[58] Field of Search ...................... 372/87, 59, 83, 89, 372/55, 61, 92, 98, 58; 378/81, 34

[56] References Cited

U.S. PATENT DOCUMENTS

| | | | |
|---|---|---|---|
| 4,617,668 | 10/1986 | Rudko et al. | 378/59 |
| 4,639,926 | 1/1987 | Wang et al. | 378/56 |
| 4,641,313 | 2/1987 | Tobin et al. | 372/56 |
| 4,651,324 | 3/1987 | Prein et al. | 372/59 |

FOREIGN PATENT DOCUMENTS

| | | | |
|---|---|---|---|
| 1256398 | 12/1971 | United Kingdom | 378/59 |
| 2028571 | 3/1980 | United Kingdom | 372/59 |
| 2083944 | 3/1982 | United Kingdom | 378/59 |

Primary Examiner—Leon Scott, Jr.
Attorney, Agent, or Firm—Edward E. Roberts

[57] ABSTRACT

A device and process using $Ag_2O_2$ and $Ag_2O_3$ as a catalyst for oxidizing carbon monoxide to form $CO_2$ at temperatures between 20° C. and 120° C. This has particular application to $CO_2$ lasers. In one $CO_2$ laser embodiment, silver is distributed on the walls of the discharge volume. The silver is divided to form electrically isolated islands to prevent interference with the discharge. After an activation process, energetic forms of oxygen, such as atomic oxygen, reacts with the silver to form endothermic silver oxides which can be easily reduced by CO. In another embodiment, the $Ag_2O_2$ or $Ag_2O_3$ catalyst is used in a convective flow laser.

12 Claims, 2 Drawing Sheets

DISCHARGE DRIVEN SILVER OXIDE CATALYST WITH APPLICATION TO A CO2 LASER

CROSS REFERENCE TO RELATED APPLICATION

This is a co-pending application to applications entitled "DISCHARGE DRIVEN GOLD CATALYST WITH APPLICATION TO A CO2 LASER" filed concurrently herewith.

BACKGROUND OF THE INVENTION

The background of the invention will be discussed in two parts:

1. Field of the Invention

This invention relates to both catalysts and lasers. More particularly it relates to a method and apparatus for improving $CO_2$ lasers by catalytically reforming $CO_2$ which was decomposed by the electrical discharge.

2. Description of the Prior

Since the $CO_2$ laser was invented, an undesirable characteristic of this laser has been the fact that the electrical discharge needed to excite the laser gas also causes the $CO_2$ in the discharge to disassociate according to the one of the following two reactions:

$$CO_2 + e \rightarrow CO + O^-$$

$$CO_2 + e \rightarrow CO + O + e$$

where "e" represents an electron in the discharge.

This reaction was first identified and characterized by the inventor herein in 1967. Since that time, there have been many studies of this process in an attempt to minimize the gas consumption expense and nuisance associated with high power $CO_2$ lasers. At low power levels, (less than 60 watts) sealed off $CO_2$ lasers have been made by accepting the loss in power associated with the partial breakdown of the $CO_2$ in the electrical discharge. This reaction eventually reaches an equilibrium according to the reaction:

$$CO + \tfrac{1}{2}O_2 \rightleftharpoons CO_2$$

However, this equilibrium usually is not reached until more than 60% of the $CO_2$ is decomposed. The problem is that the decomposition products of CO and $O_2$ have a partial poisoning effect on the laser. The result is characterized by a loss of power, a loss of gain, and a destabilization of the electric discharge.

In higher power lasers, this damaging effect is dealt with by continuously flowing the gas (a mixture of $CO_2$, $N_2$ and He with helium making up about 80% of the total) through a discharge in a time short enough to permit only partial decomposition of the $CO_2$. The rate of decomposition depends on many factors such as current density and gas pressure, but, in general, it can be said that the decomposition rate is quite rapid, usually with a time constant between 0.01 second and 10 seconds.

If a $CO_2$ laser merely flows the gas through the laser once and expels the gas, it can consume a substantial quantity of helium. For example, a 1000 watt $CO_2$ laser with no recycling of gas can consume about 100 liters of laser gas (mostly helium) at standard pressure and temperature in one hour. Fortunately, it has been found possible to reconvert the CO and $O_2$ to $CO_2$ through the use of a platinum catalyst heated to about 330° C. To do this, a vacuum pump is used to continuously circulate the gas through a closed loop which includes the electrical discharge section of the laser, the heated catalyst and the vacuum pump. Unfortunately, this process is not only expensive in terms of equipment and complexity, but it is also still wasteful of gas, since about 10% of the gas must be dumped with each cycle and new gas added. Therefore, presently, a 1000 watt $CO_2$ laser equipped with a platinum recycler typically consumes about 10 liters of laser gas per hour.

This problem can be placed in larger proportions when it is realized that presently there have been about 10,000 $CO_2$ lasers sold worldwide. While some of those are sealed off, the majority are consuming a vast amount of helium which is not only expensive, but depleting a natural resource which has a limited supply. The sealed off $CO_2$ lasers do not consume helium, but pay a different kind of penalty since they usually run at an output power which is considerably reduced compared to a comparable size flowing $CO_2$ lasers.

The problem has received a great deal of attention. The following articles and patents are cited as prior art references:

1. P.D. Tannen et al "Species Composition in the $CO_2$ Discharge Laser" IEEE Journal of Quantum Electronics Vol QE10, No. 1 1974
2. C. Willis "Catalyst Control of the Gas Chemistry of Sealed TEA $CO_2$ Lasers" J. Appl. Phys. 50 (4) Apr. 1979
3. D. S. Stark "A Sealed 100 HZ $CO_2$ TEA Laser Using High $CO_2$ Concentrations and Ambient Temperature Catalysts" J. Phys. E: Sci. Instrum. 16, 1983 158–161.
4. U.S. Pat. No. 3,789,320 W. D. Hepburn "Gas Laser Circulation System"
5. U.S. Pat. No. 3,569,857 J. A. Macken "Method and Means for Achieving Chemical Equilibrium in a Sealed Off $CO_2$ Laser
6. A. B. Lamb et al "The Removal of Carbon Monoxide from Air" J. of Industrial and Eng. Chem. Mar. 1920

In addition to the use of external catalyst, there has also been some attempt to place the catalyst inside the laser by using a heated platinum wire inside the laser or using a heated cathode which shows catalytic activity. However, this has been unsuccessful in significantly reversing the breakdown of $CO_2$ because gas diffusion is too slow to carry the gas to a small area of the tube containing the heated platinum wire or the heated cathode. It is not possible to coat large portions of the laser discharge cavity with heated platinum. While this would be successful in reconstituting the decomposed gas, the $CO_2$ laser would stop lasing because the large area heated platinum would also raise the gas temperature to an unacceptable level for laser action.

Of particular interest is reference #5 above. This patent, granted to the inventor herein, deals with including $Ag_2O$ powder in a small vial in a side tube of a sealed off $CO_2$ laser. While it was found that this material could slowly oxidize CO to $CO_2$ (over several hours) to replace oxygen lost to the oxidation of the electrodes, it also would not prevent the very rapid reaction which was the breaking down of $CO_2$ in the discharge. Finding electrodes which did not oxidize in a sealed off $CO_2$ laser provided a better solution to this problem.

Catalysts which work at ambient temperature for the CO—$O_2$ reaction are also very slow compared to heated platinum. These ambient temperature catalysts include platinum on tin oxide (Ref. #3), Hopcalite (Ref. #6—50% $MnO_2$, 30% $AuO$, 15% $Co_2O_3$ and 5% $Ag_2O$) and Cobalt oxide (Ref. #6). To use these catalysts at ambient temperature, it is necessary to offset the slow reaction rates by providing intimate contact between the gas and the catalyst. This is usually done by flowing the gas through a granular form of the catalyst.

This requires placing the catalyst away from the laser amplification volume. A pump is used to circulate the gas through the catalyst. Tests indicate that these above mentioned ambient temperature catalysts cannot be used inside the laser on the walls of the discharge volume for various reasons, such as slow reaction rates, destablization of the discharge and chemical decomposition of the catalyst.

In contrast to the prior art, this invention teaches a way of reconstituting the decomposed $CO_2$ inside the electrical discharge cavity of a $CO_2$ laser. This can be done at temperatures below 45° C., without destabilizing the discharge and without the need to recirculate the gas. It is also possible to use the teachings of this invention to reconstitute the decomposed $CO_2$ in a "flow" laser. In this case, the low operating temperature of this process does not require the use of additional heating of the gas as would be required in a platinum catalyst. These and other advantages will be presented. The teachings of this invention also can be applied to other devices besides lasers.

SUMMARY OF INVENTION

In a $CO_2$ laser, the electrical discharge has an undesirable side effect of decomposing the $CO_2$ to carbon monoxide and oxygen. However, the electric discharge also makes short lived, energetic forms of oxygen which are very reactive. This invention describes a catalyst which works in the presence of these short lived energetic forms of oxygen. In one embodiment of the invention, unstable oxides of silver (primarily $Ag_2O_3$) coat the walls facing the laser amplification volume at about 40° C. This material is rapidly reduced by the carbon monoxide. Then an energetic form of oxygen (such as atomic oxygen, reforms the starting material as shown:

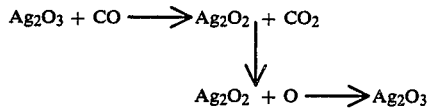

In diffusion limited lasers, the silver oxide catalyst should be distributed broadly on the walls facing the discharge.

In another embodiment applicable to convective flow lasers, the silver oxide is positioned in the flowing gas near the exhaust end of the laser discharge. Besides lasers, this invention has application to other environments which generate energetic forms of oxygen.

DESCRIPTION OF PREFERRED EMBODIMENTS

Figure 1:
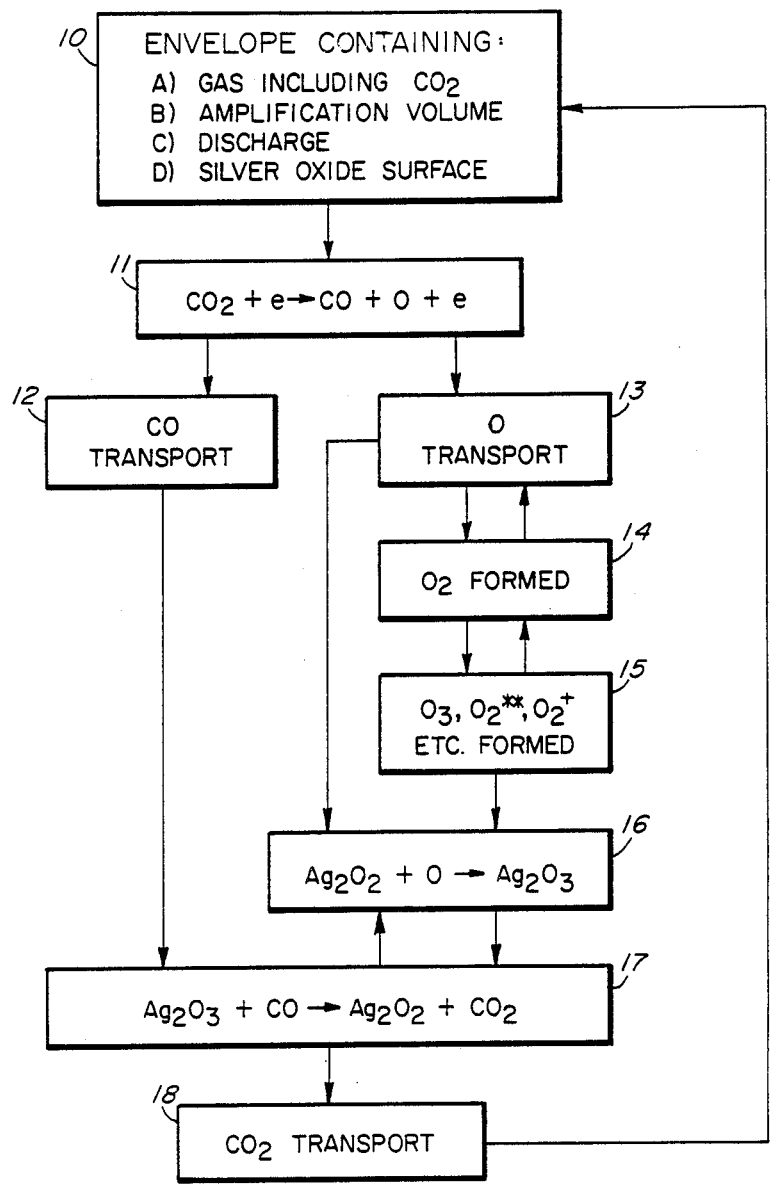
FIG. 1 is a flow diagram showing the chemical and mechanical processes.

The $CO$—$O_2$ reaction is exothermic, but does not proceed at ambient temperature because there is a large activation energy associated with the initiation of the reaction. A non-catalytic material, such as aluminum oxide must be heated to 1000° K. in a CO and $O_2$ gas mixture for this reaction to proceed. Even at 1000° K. only a small percentage of the thermally excited molecules achieve a high enough energy to overcome this activation energy and oxidize the CO to $CO_2$. This is an example of a thermally driven chemical reaction because the kinetic energy of the molecules is used to overcome the activation energy. The activation energy for oxidation of CO by $O_2$ is estimated to be in excess of 1.5 electron volts.

Even the use of catalysts, such as platinum, paladium, cobalt oxide and Hopcalite depend only on heat (kinetic energy of the molecules) to overcome the activation energy. The catalyst merely reduced this activation energy by providing intermediate reactions. However, it was realized that inside the $CO_2$ laser, there is a unique environment which offers a new approach to catalysts.

Inside the $CO_2$ laser, the electric discharge, makes energetic species of oxygen compared to $O_2$. This energetic oxygen usually cannot combine with CO (without a third body) because there is *too much* energy available. It is no longer a problem of overcoming the activation energy, but in the gaseous phase, the problem is removing energy so that the $CO_2$ molecule can hold together. For example, the very process of decomposing $CO_2$ yields atomic oxygen (O) according to the equation:

$$CO_2 + e \rightarrow CO + O + e$$

Atomic oxygen can also be formed inside the discharge in several ways, including the following:

$$O_2 + e \rightarrow O + O^-$$

The atomic oxygen often lasts until it diffuses to the wall. Some of the atomic oxygen also combines with $O_2$ to form Ozone $O_3$ but this reaction also needs a third body. Ozone is also very reactive.

Finally, diatomic oxygen ($O_2$) is known to have at least two long lived excited vibrational states which will be designated as $O_2^*$ and $O_2^{**}$. Therefore, even molecular oxygen ($O_2$) is being continuously excited to an energetic species as long as it remains in the discharge. Therefore, in the discharge, there exists at least four forms of energetic oxygen which are electrically neutral. None of these would normally be encountered either in air or in the laser gas once the gas has left the discharge region for a time longer than the life time of the various species of energetic oxygen. In summary, these four neutral energetic oxygen states and their energies of formation relative to $O_2$ are:

(1) Atomic oxygen: $O \sim 2.6$ ev (endothermic 250 KJ/mol)
(2) Ozone: $O_3 \sim $ b 1.5 ev (endothermic 140 KJ/mol)
(3) Excited oxygen: $O_2^* \sim 1$ ev (endothermic 92 KJ/mol)
(4) Excited oxygen: $O_2^{**} \sim 1.6$ ev (endothermic 154 KJ/mol)

Besides the above neutral forms of energetic oxygen, there is also various ionized sources of energetic oxygen which have been identified in the $CO_2$ laser discharge. The major positively charged ions which can also serve as a source of oxygen are: $O_2^+$, $O^+$, and $NO^+$. The positively charged ions are partially attracted to the walls of the discharge cavity to neutralize the electron diffusion to these walls. Finally, it is possible that the ultraviolet light generated in a discharge can be absorbed by certain solids in a way as to create "hot" electrons which can disassociate $O_2$ into atomic oxygen on the surface of the solid. See "Ultraviolet Light Stimulated Thermal Oxidation of Silicon, E. M. Young, Appl. Phys. Lett. 50 (2). Of all the energetic forms of oxygen mentioned, atomic oxygen is probably the most important because of its abundance and reactivity.

All of these neutral and ionized species except for ozone are usually deactivated with a wall collision. At the reduced gas pressure and discharge cavity size of a slowly flowing $CO_2$ laser, they usually have a half life less than 20 milliseconds. However, in some flow lasers operating with large cavity sizes at higher pressure, the diffusion to the wall is greatly reduced. It may be possible for some of these neutral energetic forms of oxygen to survive for up to one tenth second.

The goal, therefore, is to make use of the energy in these short lived energetic forms of oxygen (and possibly the ultra violet light) so that at least a portion of the driving energy for a catalytic reaction comes from the discharge. This would permit the thermal energy requirement to be kept low enough that a fast catalyzed reaction can proceed at temperatures below about 50° C.

From the philosophical approach described above, two classes of materials were found which catalyze the formation of $CO_2$ in the laser environment. These materials are gold and endothermic oxides of silver. This document deals with the use of endothermic silver oxides as a catalyst. A co-pending application entitled "DISCHARGE DRIVEN GOLD CATALYST WITH APPLICATION TO A $CO_2$ LASER" deals with the use of gold as a catalyst.

It is possible for the above mentioned energetic forms of oxygen to be used to oxidize the carbon monoxide if a material can be found which can be oxidized by the energetic oxygen in the discharge to form one or more energetic oxides which are both endothermic and unstable. The unstable character means that the oxide has a low activation energy for decomposition. The endothermic character means that it releases energy when it decomposes. Together, this assists the process of oxidizing the CO to $CO_2$ and simultaneously reducing the oxide. Once the oxide has been reduced, the process can start over again. These desirable characteristics have been found in the higher oxides of silver. Silver is known to form three oxides.

The progression up the oxidation chain is as follows:

$2 Ag + \frac{1}{2} O_2 \rightarrow Ag_2O$ 3.1 KJ/mol exothermic, decomposes ~300° C.

$Ag_2O + \frac{1}{2} O_2 \rightarrow Ag_2O_2$ 7 KJ/mol endothermic, decomposes ~130° C.

$Ag_2O_2 + \frac{1}{2} O_2 \rightarrow Ag_2O_3$ 58 KJ/mol endothermic, decomposes ~120° C.

It can be seen that $Ag_2O_2$ and $Ag_2O_3$ are both endothermic relative to the next lowest oxide. In addition, these two oxides both are sufficiently unstable to decompose rapidly at 150° C. and will decompose slowly at ambient temperatures. In the future, $Ag_2O_3$ and $Ag_2O_2$ will be referred to as "endothermic silver oxides."

Tests of endothermic silver oxide catalyst has been conducted inside an electrical discharge. Starting with a piece of silver sheet or a silver coated dielectric, an activation process is desirable to prepare the surface. This process is further discussed below. Also, the size of an individual piece of silver is made small enough so that the electrical discharge does not divert from the gas and pass through the silver.

When this small, activated piece of silver is exposed to a $CO_2$ laser discharge, it will quickly (within one second) turn a blue-black color. This is believed to be the $Ag_2O_2$ oxide of silver forming on the surface ($Ag_2O_2$ is sometimes called AgO, but X-ray diffraction tests have shown that $Ag_2O_2$ is the correct designation). As the discharge continues, this $Ag_2O_2$ layer increases in thickness and the blue-black color changes to a velvet black. This color change can happen over the next 10 seconds, but the time depends on the temperature of the silver. This black layer is believed to be just a thicker layer of the blue-black $Ag_2O_2$.

Continued exposure to the discharge causes the color of the oxide layer to loose its velvet black appearance and becomes grey. Closer inspection of the oxide reveals that this grey color is actually the formation of a new white powder oxide on top of the blue-black $Ag_2O_2$ oxide. This new white oxide is believed to be $Ag_2O_3$. This grey appearance then becomes the stable form of the oxide in a normal $CO_2$ laser discharge when the temperature of the silver is kept less than about 50° C.

FIG. #1 is a flow chart indicating some of the steps involved in using endothermic silver oxides as a catalyst. The first step (10) involves providing an envelope which contains the laser gas and the portion of the laser which will be called the "laser amplification volume." This is the volume where the stimulated emission of radiation is taking place. This volume contains the optical beam and almost always contains, at least a portion of the electrical discharge. In addition to these standard components of a $CO_2$ laser, an endothermic silver oxide coated surface is added. This endothermic silver oxide is configured and positioned to serve as a catalyst.

Block 11 of FIG. 1 represents the breaking apart of the $CO_2$ by the electrical discharge. This proceeds at a rate which depends on several factors including current density, gas pressure and gas composition.

Typically, in continuous lasers, the rate of decomposition can proceed so that the half-life of a $CO_2$ molecule can range from 0.1 second to several seconds. A chemical equilibrium is eventually reached. However, this equilibrium usually has more than 60% of the $CO_2$ decomposed. This has detrimental results on the laser power, gain, efficiency, and discharge stability.

In FIG. 1, block 11 can also be thought of as the first step in the process of reconstituting the $CO_2$ because in block 11, CO and O are formed. Since CO is stable, the transportation of CO to the endothermic silver oxide surface (block 12 to block 17) is generally uncomplicated. However, the atomic oxygen (block 13) has a limited lifetime. It can combine with another atomic oxygen atom to form $O_2$ (block 14), but this requires a third body such as a wall or a three body collision in the gas phase. If the $O_2$ is still in the discharge, it can be broken apart again forming atomic oxygen (reverse arrow to block 13), or it can form some other species of energetic oxygen (block 15). Energetic oxygen can eventually reach the silver oxide (block 16) by diffusion or conduction.

In block 16, the $Ag_2O_2$ form of silver oxide is showed being oxidized by atomic oxygen to $Ag_2O_3$. However, this block containing a single reaction is intended to represent the general case of the oxidation of a lower oxide of silver to a higher oxide of silver by energetic oxygen in some form. For example, another possible reaction would be $Ag_2O+O_3 \rightarrow Ag_2O_2+O_2$. Block 17 represents the reduction of an endothermic silver oxide by carbon monoxide to form carbon dioxide. Block 17 shows only one reaction, but represents several reactions. Another possible reaction would be $Ag_2O_2+CO \rightarrow Ag_2O+CO_2$. The reverse arrow from block 17 to block 16 indicates the reformation of the higher oxide of silver by energetic oxygen. This step is the reason that the endothermic oxides of silver are catalysts in the discharge environment, but they are not catalysts in an environment which lacks energetic oxygen.

In block 18, the $CO_2$ is transported (by diffusion or conduction) back to the amplification volume. This replaces $CO_2$ in the gas mixture and the cycle can start over again.

In this diagram, it is important to note that block 11 is the decomposition step. All of the other blocks are involved with reconstituting the decomposed $CO_2$. Ideally, the rates of all of these other steps put together should be much faster than the rate for step 11. Fortunately, this goal can be achieved with an endothermic silver oxide catalyst when it is in a porous form, properly positioned and at a sufficiently high temperature. The rate limiting step appears to be block 17.

In experiments, it has been found that this step is sufficiently rapid at 40° C. to achieve the desired goal of rapidly reforming the $CO_2$. However, this reaction (block 17) proceeds at lower temperatures, but at a reduced rate. Therefore, it is possible that the silver oxide catalyst can operate at a lower temperature (20° C., for example), if the rates for the other steps are changed. For example, the rate of decomposition (block 11) could be slowed at a lower average current. Also, the rate of block 17 can increase by increasing the CO concentration or improving the porosity of the silver oxide.

If the gas is removed from the discharge for a sufficient time, then the process will eventually be halted at block 13 which is the formation of $O_2$.

Figure 2:
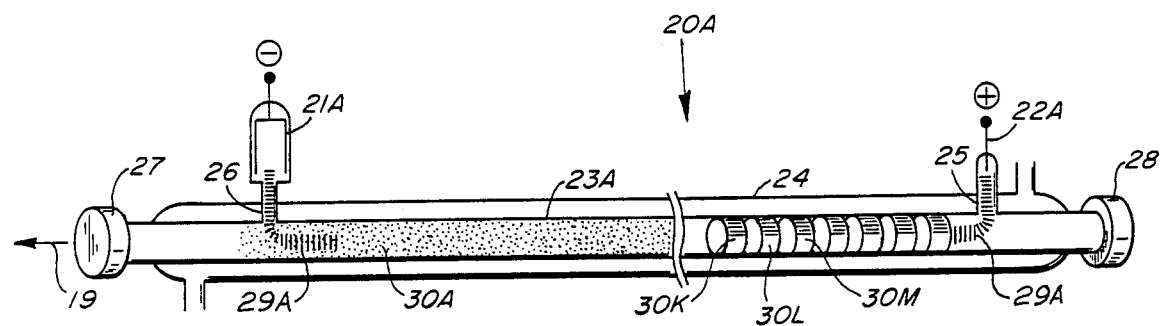
FIG. 2 is a side view diagram of a conventional $CO_2$ laser broken into two sections to demonstrate two different placement methods for the catalyst.
Figure 3:
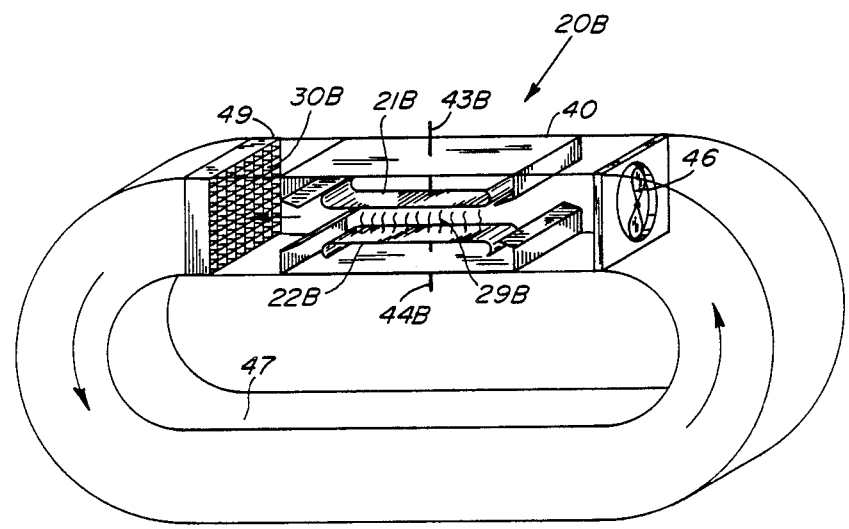
FIG. 3 is a perspective view of a convective flow $CO_2$ laser incorporating the catalyst.
Figure 4:
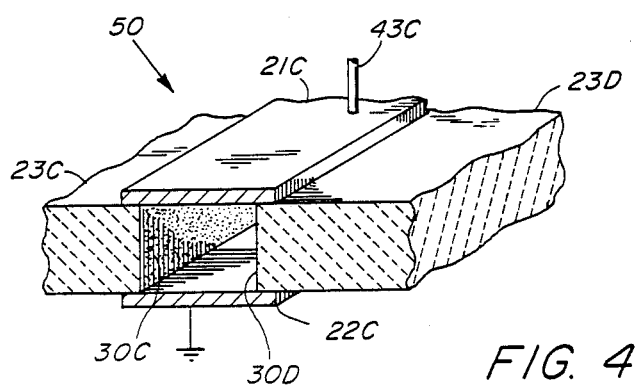
FIG. 4 is a perspective cross sectioned view of a portion of a waveguide laser.

FIGS. 2, 3 and 4 depict three different types of laser structures. However, in these figures, there are parts which perform analagous functions. Therefore, when it is important to understand the analogy, the numbering of the parts will be similar (30A, 30B, 30C, etc.). FIG. 2 illustrates two ways of implementing the use of a silver oxide catalyst. In FIG. 2, 20A is a representation of a $CO_2$ laser which can either be considered sealed off or slowly flowing gas (pump and gas ports not shown).

In FIG. 2, the cathode (21A) and anode 22A are connected to a source of electrical power (not shown). The laser has an inner tube (23A) surrounded by an outer tube 24. Water or other cooling fluid is flowed through the space between tubes 23A and 24. Tube 26 connects cathode 21A to tube 23A, while tube 25 connects anode 22A to tube 23A. Mirrors 27 and 28 are positioned at the end of tube 23A. A laser gas mixture, such as $CO_2$, $N_2$ and He (perhaps CO and Xe also) is inside the closed envelope formed by tubes 23A, 25, 26 and mirrors 27, 28.

When electrical power is applied to electrodes 21A and 22A, a discharge is 29A formed through tube 23A. The electrical discharge is only partly shown in FIG. 2 to avoid confusion with the illustration of the catalyst. In FIG. 2, the amplification volume would be the portion of tube 23A between the points of connection for tubes 26 and 25. This is the volume containing both the discharge and the laser beam.

To obtain a beneficial effect, it is desirable to distribute clean silver oxide on the inside walls of tube 23A facing the amplification volume. However, when the silver oxide is formed on the surface of silver metal, the silver must be broken up into electrically insulated islands to prevent the discharge from deviating from the gas and passing through the silver. If this were to happen, a cathode would form at one end of the silver and an anode would form at the other end of the silver strip. Since the cathode drop is about 450 V in a $CO_2$ gas mixture, the discharge will not pass through the silver if individual silver islands are made small enough that the voltage gradient across individual electrically conducting islands is less than 450 volts.

The voltage gradient depends on many factors, but a typical voltage gradient would be 100 V/cm. In this example, the silver should be made shorter than 4.5 cm in the direction of the electric field gradient to avoid this undesirable discharge deviation. However, in practice, it is desirable to make the islands much smaller than this limit. In the preferred embodiment, the islands would have a length in the direction of the electric field gradient less than ¼ tube diameter.

Returning to FIG. 2, rings 30K, 30L, 30M, etc. can represent silver deposits on the inside of tube 23A. The silver oxide layer forms on these silver rings. As can be seen, these rings are separated from each other and are a length parallel to the axis of tube 23A which is about ¼ tube diameter. These rings could also represent coiled sheets of springy metal, such as electroplated silver on nickel. The preferred process for oxidizing this silver will be discussed later. The coiled metal rings could be held in place by friction due to the spring tension in the metal.

Another alternative is illustrated in the other half of tube 23A in FIG. 2. The coating 30A is depicted as consisting of many fine dots. This is meant to represent a silver oxide coating which is not electrically conduction along the surface.

Ideally, it is desirable to cover with silver oxide as much of the area facing the amplification volume as possible without forming electrically conducting paths which can deviate the discharge. However, good performance is still obtained when less than 50% of the area is covered, provided that the silver oxide is distributed along the length of the amplification volume and the temperature is proper. Also, the gaps in the silver oxide parallel to the tube axis should be kept smaller than one tube diameter in length. Acceptable coatings may be obtained with experimentation.

FIG. 3 shows a portion of a transverse flow $CO_2$ laser. In FIG. 3, the electrical discharge is represented by 29B between electrodes 21B and 22B. Electrical power is fed to these electrodes by wires 43B and 44B respectively. These electrodes are supported by structure 40. Fan 46 represents a pump which circulates the laser gas through the closed loop path depicted by the flow arrows. Structure 47 forms this path. Number 49 is a multiple channel structure coated with the silver oxide catalyst 30B. This structure could perform double duty if it was also the heat exchanger required to cool the gas. The requirements for making intimate contact with the gas are the same for both the heat exchanger and the catalyst. Therefore, combining these functions may be desirable, but not necessary.

The positioning of 30B is intended to be close to the exhaust of the discharge region because it is desirable to capture as much energetic oxygen as possible to achieve a high catalytic conversion efficiency.

In a rapidly flowing system, it is desirable to position the catalyst where the flow velocity is sufficiently reduced to prevent scattering of the silver oxide powder. Since the $Ag_2O_2$ and $Ag_2O_3$ decompose rapidly at temperatures above 150° C., it may be desirable to keep these oxides below the temperature. It appears as if the optimum temperature for a silver oxide catalyst in a flowing system may be between 60° C. and 120° C.

In FIG. 3, the laser mirrors are not shown, but they would face each other through the discharge volume 29B. They would be part of the envelope which contains the laser gas.

FIG. 4 is a cross section of a portion of an RF waveguide laser. However, this figure can also be used to illustrate the preferred embodiment for any square or rectangular cavity with a transverse discharge. For example, this would include a "T" laser or a high aspect ratio rectangular cavity, such as described in this author's pending patent application titled "Magnetically Enhanced Electrical Discharge with Application to Lasers."

In FIG. 4, plates 21C and 22C are electrodes. For a waveguide laser, these are flat metal plates which are electrically driven through terminal 43C. Plate 22C is connected to ground as shown. However, it is to be understood that in other transverse discharge laser configurations (whether AC, DC or pulsed) these plates merely represent the appropriate electrode configuration. In FIG. 4, parts 23C and 23D are dielectric pieces, such as ceramic. The surface of these pieces which face the amplification volume are shown as 30C and 30D respectively.

The preferred embodiment would have the silver oxide catalyst placed on surface 30C and 30D. In FIG. 4, surface 30C is visible and illustrated by small dots which represent a silver oxide layer similar to 30A in FIG. 2. If this layer is on metallic silver, then the silver should be electrically isolated into islands to prevent electrical conduction through the silver. The inside surfaces of plates 21C and 22C could also be silver oxide coated, but in a waveguide laser, the silver oxide would not make an acceptable reflecting surface for guiding the laser beam.

Variations on FIG. 4 can easily be envisioned by those skilled in the art. If plates 23C and 23D were greatly enlarged in the direction parallel to the electric field gradient, then the cavity would be rectangular similar to the cavity in the above mentioned patent application by this author. If plates 21C and 22C were replaced by the electrode configuration (such as multiple pins) appropriate for "T" lasers, then the dielectric surface between the pin electrodes could also be coated with a silver oxide catalyst.

The following experiment illustrates the performance of this catalyst. Brass strips which were 13 mm wide, 80 mm long and 0.013 mm thick were electroplated with silver. These strips were then formed into rings about 30 mm diameter. This made a structure similar to FIG. 1 where 30K, 30L, etc. are the silver coated brass rings.

Seven of these rings were then inserted into a 28 mm diameter, water cooled pyrex discharge tube. They were positioned so that they sprung snugly against the wall. Each ring was spaced 2 mm from the adjacent rings to prevent electrical contact. The silver coating was then activated using the process to be described later. The water had to be heated to accomplish this. The discharge tube was then evacuated and filled with a flowing gas mixture of 1 torr $CO_2$, 2 torr $N_2$ and 10 torr He. A current of 50 ma was passed through the gas. The water temperature was allowed to raise to 40° C.

The silver went through the various color changes previously described and reached the $Ag_2O_3$ steady state after several minutes. A valve in the vacuum line was then partially closed to restrict the flow through the laser to about 10 1/min at a pressure of 13 torr. The oxide coated rings were located about 70 cm from the gas input end of the tube. The cathode was also located near the gas input. The anode and gas output was located 20 cm past the oxide coated rings.

When a discharge was initiated at a current of 40 ma, the color of the discharge changed from pink near the input end to white near the middle of the tube. However, the discharge color turned back to pink in the region of the silver oxide coated rings. This pink color again faded to white as the gas flowed down the tube further to the exhaust end of the tube. It is known that this color change is associated with the composition of the gas in the discharge. The pink color is characteristic of a discharge where there is little or no decomposition of the $CO_2$. The white color is characteristic of the $CO_2$ decomposition having progressed to about 25% or more decomposition. Intermediate colors can also be estimated.

This experiment demonstrated that the silver oxide coating was converting the CO and oxygen back to $CO_2$ and thereby, producing the pink color. The decomposition process started again as the gas flowed down the tube after leaving the coated rings. Sealing the discharge tube off produced a white discharge everywhere except in the region of the rings where the discharge was pink. This experiment was conducted at a wall temperature of about 40° C. Presumably, the silver oxide was somewhat warmer. Other experiments were also performed to make sure that this color change was not caused by water vapor.

Earlier in this description, there was mention of "activated silver" which exhibited the various characteristics described. Part of the preparation is the above mentioned isolation of the silver. However, another part of the preparation of the silver is the activation of the surface which amounts to forming a certain type of porous silver or silver oxides. The following example illustrates what will happen to silver which has not been activated. A piece of silver sheet was made into a ring and placed against the inside of a cylindrical laser discharge tube. When the discharge in $CO_2$, $N_2$ and He is initiated in the tube and the wall temperature is less than about 30° C., then a smooth black oxide film will form on the inside surface of the ring provided that the silver is very clean.

This film is primarily $Ag_2O_2$ in a form which does not exhibit sufficient catalytic activity to be useful inside a $CO_2$ laser. (Step 17 in FIG. 1 is too slow.) Even heating this material to 45° C. produces unsatisfactory results.

The silver oxide catalytic reactivity can be greatly improved by initially activating the silver. This activation process amounts to creating finely divided silver with a certain physical structure which promotes formation of $Ag_2O_3$. The preferred method for creating the activated silver surface are as follows:

1. Thoroughly clean the silver surface using solvents or nitric acid.
2. Place the silver to be activated in an electrical discharge cavity with the area to be activated facing the electrical discharge.
3. Raise the temperature of the silver to about 65° C.
4. Establish an electrical discharge in a gas which contains Oxygen, Nitrogen, water vapor, and an inert gas. For example, 10 torr Helium and 2 torr air (humidity > 50%) in a glass tube 28 mm ID at a current of 50 ma.
5. Allow sufficient time for the energetic oxygen to oxidize the surface to a grey color (about 1 minute).
6. Reduce this coating to white colored silver metal using CO ($H_2$ or sufficient heat could also probably be used). This reduction step can be accomplished with CO without an electrical discharge if the temperature is raised above about 90° C. It is also possible to use a discharge containing CO, $N_2$ and He.
7. It is desirable, but not essential to repeat steps 5 and 6 again to go through an additional oxidation and reduction cycle.

The silver has been activated. The surface appears to be white finely divided silver. The white silver surface will turn blue in less than one second when exposed to the normal $CO_2$ laser discharge and progress through the other colors previously mentioned eventually ending with an $Ag_2O_3$ layer. The activation process described above is just the preferred way of obtaining a porous $Ag_2O_3$ coating. Starting with silver metal, the surface was oxidized, reduced, then oxidized again to the $Ag_2O_3$ state. This preferably was done without liquid solutions to obtain the maximum porosity. Those skilled in the art also know other methods of accomplishing these goals.

The $Ag_2O_3$ layer can oxidize CO to $CO_2$ even at 20° C., but the rate of this process increases greatly in a wall temperature range of 40° C. The optimum temperature for maximum laser output can be found experimentally. Normally, the laser operates best with walls as cool as possible, but the rate of catalytic conversion increases with temperature. The optimum distribution would be to have as much of the wall area facing the discharge as possible covered with the $Ag_2O_2$ and $Ag_2O_3$ catalyst, but leaving the electrical insulating spaces previously discussed. Reduced coverage may also give acceptable results depending on the laser construction and operating conditions.

Since the decomposition is taking place throughout the volume of the amplification volume, it is necessary to distribute the silver oxide so the catalytic process can offset this decomposition. The rates of the steps in FIG. 1 are such that, for a diffusion limited laser, the catalyst can only compete against this decomposition rate if the diffusion distances are sufficiently short. This requirement explains why the use of silver electrodes has not produced a benefit in maintaining the $CO_2$ level in the amplification volume. Silver electrodes are also removed from the amplification volume even though they are contacted by the discharge.

The effect of additives to the silver has been studied. It has been found that the effects of additives do not have a significant beneficial effect in the chemical process, although there can be other benefits to additives. This finding contrasts greatly with the work done in reference #6. In that work, $Ag_2O$ was tried, but found not to be a catalyst when used alone. When an additive, such as copper is alloyed with silver to make sterling silver, for example (92½% to Ag, 7½% Cu), it has been observed that this mixture is slightly easier to oxidize for the first time than pure silver, possibly because there are more dislocations in a crystal structure. However, once the material has undergone the activation process previously described, there does not seem to be any advantage or disadvantage to have the copper content. However, materials such as manganese or vanadium mixed with silver do present a disadvantage in as much as Mn and V seem to destabilize the electrical discharge when a significant portion of the wall area is covered by oxides of these materials.

A preferable material is silver deposited by a screening process on $Al_2O_3$ ceramic. This is known as a "thick film screening process" and is widely used to make printed circuits on aluminum oxide ceramic. A formulation containing silver powder, nitrocellulose, a glass frit powder and a solvent are screened onto the ceramic, then fired at 800° C. to fuse the silver and glass frit while driving off the solvent and nitrocellulose. The glass frit is typically a low melting point lead borosilicate glass. The exact benefit of the glass frit is not known, but it may be purely mechanical.

The uniformity and adherence of a $Ag_2O_3$ and $Ag_2O_2$ coating inside a $CO_2$ laser is very important because any powder flaking off may get on the laser mirrors and cause damage. The advantage of forming the oxide coating on silver metal (compared to powdered silver oxide) is largely because the oxide coating on the metal seems to be sufficiently adherent to be used in a laser system.

The addition of other materials to the silver, such as glass, silica gel, metals and metal oxides are considered within the range of alternatives anticipated here provided that the active material is predominately the endothermic oxides of silver consisting of $Ag_2O_2$ and $Ag_2O_3$.

Althoug the above has centered on application to $CO_2$ lasers, it should be understood that the teaching contained herein can be applied to other environments where it is desirable to form $CO_2$ at temperatures lower than the temperature which platinum or paladium become efficient catalysts (about 300° C.). The key ingredients are: (1) a source of CO, (2) a source of energetic oxygen, (3) a catalytically active endothermic silver oxide surface and (4) placement of this surface close enough to the source of the energetic oxygen that, considering the energetic oxygen lifetime and gas transport rates, the silver oxide can be struck by the energetic oxygen.

Sources of energetic oxygen can include any source which can put enough energy into a molecule which contains at least one atom of oxygen to form one of the previously mentioned forms of energetic oxygen. Sources of such energy include: electrical discharge, ultraviolet light (and other more energetic forms of electromagnetic radiation shorter than about 3500 Angstroms) and rapidly moving subatomic particles, such as alpha particles, neutrons, protons, electrons, etc. The teachings contained herein can be applied also to these other environments.

While the discussion has centered on a laser oscillator, the teachings herein apply equally well to a laser amplifier. Therefore, to cover both these catagories, the term "laser device" is appropriate.

The gas in a $CO_2$ laser has been mentioned in the text as being made up of $CO_2$, $N_2$ and He. This was only mentioned as an example. It is well known to those skilled in the art that other gas mixtures, such as $CO_2$, CO, He are also commonly used in sealed off lasers. Other gas additives include Xe, $H_2O$, $D_2$, Ar, etc. It appears as if this catalyst works with all $CO_2$ laser mixtures.

In rating the effectiveness of a catalyst, it is grammatically easier to talk about minimizing the decomposition products rather than maximizing the amount of $CO_2$. In particular, it is desirable to minimize the amount of oxygen in the amplification volume because oxygen has a detrimental effect on the laser output power and discharge stability.

While there has been shown and described a preferred embodiment, it is to be understood that other modifications may be made without departing from the spirit and scope of the invention.

I claim:

1. A $CO_2$ laser device including a closed envelope containing a $CO_2$ laser gas mixture and laser amplification volume, said amplification volume including an electrical discharge through said $CO_2$ laser gas mixture, said discharge causing decomposition of $CO_2$ in said mixture to form carbon monoxide, oxygen, and energetic forms of oxygen, the improved feature comprising:

inside said envelope there is at least one surface coated with an endothermic oxide of silver;

said oxide of silver coated surface is positioned and configured to promote contact with both said carbon monoxide and said energetic forms of oxygen generated in said amplification volume, for purposes of catalyzing formation of $CO_2$.

2. The combination according to claim 1 wherein said endothermic oxide of silver is $Ag_2O_3$ in a porous, but adherent configuration.

3. The combination according to claim 1 wherein the said endothermic silver oxide coating is on at least a portion of the wall area facing said amplification volume and distributed over a sufficiently broad area of said wall area to promote the catalytic formation of $CO_2$ in at least a substantial portion of said laser gas mixture in said amplification volume.

4. The combination according to claim 3 wherein said oxide of silver is made porous for the purpose of increasing the catalytic activity.

5. The combination according to claim 1 wherein said $CO_2$ laser device has said gas mixture rapidly flow through said amplification volume and where said silver oxide coated surface is a relatively large surface area structure designed to make intimate contact with said flowing gas and positioned sufficiently close to gas exhaust end of said amplification volume to be contacted by a substantial amount of said energetic oxygen.

6. The combination according to claim 3 where said endothermic oxide of silver forms a coating on metallic silver, also said metallic silver is formed into multiple separate regions which are electrically insulated.

7. The combination according to claim 1 wherein said endothermic oxide of silver catalyst and said electrode are different.

8. The combination according to claim 7 wherein said endothermic oxide of silver catalyst functions independently as part of a laser resonator reflector.

9. In a method for converting carbon monoxide and oxygen to $CO_2$ at temperatures less than 200° C., the steps in no particular order comprising:

provide a means for forming at least one energetic form of oxygen;

provide an endothermic silver oxide coated surface positioned so as to promote contact with both said carbon monoxide and said energetic form of oxygen for the purposes of making a low temperature catalytic formation of $CO_2$.

10. The method of claim 9 where the step of providing a means for forming at least one energetic form of oxygen includes the step of providing energy to a source of oxygen, said energy means selected from the group consisting of:

an electrical discharge, electromagnetic radiation shorter than 3000 Angstroms wavelength, or rapidly moving subatomic particles.

11. The method of claim 10 where the step of providing an energy source includes providing an electric discharge in a $CO_2$ laser device.

12. The method of claim 11 where the step of providing a silver oxide coated surface includes an activation process which includes the steps of oxidizing metallic silver, then reducing this compound, then oxidizing the silver again.

* * * * *